United States Patent [19]

Ida

[11] Patent Number: 4,669,872

[45] Date of Patent: Jun. 2, 1987

[54] TEMPERATURE MEASURING DEVICE

[75] Inventor: Yoshiaki Ida, Hyogo, Japan

[73] Assignee: Mitsubishi Denki Kabushiki Kaisha, Tokyo, Japan

[21] Appl. No.: 787,592

[22] Filed: Oct. 15, 1985

[30] Foreign Application Priority Data

Oct. 17, 1984 [JP] Japan ............................ 59-157607[U]
Oct. 17, 1984 [JP] Japan ................................ 59-219122

[51] Int. Cl.⁴ ............................................... G01J 5/08
[52] U.S. Cl. ....................................... 356/43; 356/435; 374/131
[58] Field of Search ............... 356/43, 435; 350/96.15, 350/96.16; 374/131, 132, 161, 162

[56] References Cited

U.S. PATENT DOCUMENTS 4,462,699  7/1984  Shaw et al. ........................ 356/43 X

FOREIGN PATENT DOCUMENTS 0014848  9/1980  European Pat. Off. .
3208447  9/1982  Fed. Rep. of Germany .

Primary Examiner—Eugene R. LaRoche
Assistant Examiner—Robert J. Pascal
Attorney, Agent, or Firm—Sughrue, Mion, Zinn, Macpeak & Seas

[57] ABSTRACT

An optical type temperature measuring device which provides an accurate output in spite of temperature variations of the sensor or degradation of the characteristics of the sensor over time. The device includes a light source, a spectroscope, and a temperature sensor made of a material having one end coupled through a first optical guide to the light source and the other end coupled through another optical guide to the spectroscope. The output of the spectroscope is converted to an electrical signal, which is subsequently detected with plural different comparison levels to obtain higher end values of the absorption wavelength ranges of the sensor at the respective reference levels. These higher end values are then processed to obtain a rising point of a temperature dependent light absorption characteristic curve of the temperature sensor.

4 Claims, 7 Drawing Figures

TEMPERATURE MEASURING DEVICE

BACKGROUND OF THE INVENTION

The present invention relates to a temperature measuring device, and particularly to such a device utilizing a temperature sensor made of a material wherein, in an edge portion thereof, the light absorbing spectrum varies with temperature. Such measuring devices are known, for example, from Japanese Laid Open Patent Applications Nos. 8878/1980 and 6731/1982.

A typical example of a conventional temperature measuring device of this type is shown schematically in FIG. 1, in which reference numeral 1 depicts a drive circuit for a light-emitting element used as a light source 6, 2 and 4 optical fibers, 6 a light-emitting element used as a light source, and 9 a temperature sensor made of a crystalline semiconductor material or amorphous semiconductor material such as GaAs for which the higher end of its light absorbing wavelength range, and hence its light transmittance, varies with temperature. The temperature sensor 9 is disposed between the optical fibers 2 and 4 and bonded thereto by a suitable adhesive.

An example of the temperature dependency of the light transmittance of the temperature sensor 9 is shown in FIG. 2 with the wavelength plotted on the abscissa, from which it is clear that the higher end of the light absorbing wavelength range of the temperature sensor 9 is shifted to the side of longer wavelengths with an increase of temperature.

FIG. 3 is a graph showing the spectrum of light produced by the light-emitting element 6 and the spectrum of light which passes through the temperature sensor 9.

In FIG. 1, the temperature measuring device further includes a diffraction grating 15 used as a spectroscope, a photodiode array 16, comparators 17, each connected to a different photodiode of the array, and a processing circuit 18.

In operation, the light-emitting element 6 is driven by the drive circuit 1 and emits light. Assuming that the light-emitting element 6 is an LED, the spectral distribution of the emitted light follows a normal distribution, as shown in FIG. 3. The temperature sensor 9 is selected such that the higher end of its light absorbing wavelength range is positioned within the normal distribution of the spectrum of light emitted from the LED 6. Since the higher end shifts with temperature variation as shown in FIG. 2, the spectrum of light passed through the temperature sensor 9 at a certain temperature is as shown by a hatched portion in FIG. 3. This spectrum is transmitted through the optical fiber 4 to the diffraction grating 15 where it is decomposed to wavelength components which are received by respective ones of the photodiodes of the array 16. Electric signals from the photodiodes are compared by the comparators 17 associated therewith with respective comparison levels, and outputs of the comparators 17 are processed by the processing circuit 18 to obtain the position of a photodiode of the array 16 corresponding to the shortest wavelength of the light passed through the temperature sensor 9.

In such a conventional temperature measuring device, since the curve defining the higher end of absorption wavelength range of the temperature sensor 9 is not completely linear, there may occur measuring errors when there is a large intensity variation or a center wavelength variation of light received by the sensor 9 due to temperature variations of the sensor 9 or time variations of the characterstics thereof.

SUMMARY OF THE INVENTION

It is thus an object of the invention to overcome the above mentioned problem inherent in the conventional temperature measuring device, and specifically it is an object of the invention to provide a temperature measuring device capable of measuring temperature precisely, even if the intensity or center wavelength of the light from the light source varies due to temperature variations of the light source or time dependent degradations of the characteristics thereof.

According to the present invention, the output wavelength of a temperature sensor, after being spectroscopicaly processed, is detected at a plurality of different detection levels, and a fixed end point of the light absorption wavelength range of the sensor is caluculated on the basis of lower wavelength values of the detected wavelength ranges. With this arrangement, there is no temperature dependent error produced even if the intensity and/or the center wavelength of the light source varies.

DESCRIPTION OF THE PREFERRED EMBODIMENT

Figure 1:
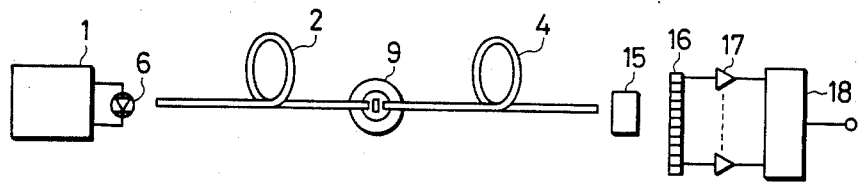
FIG. 1 shows schematically an example of a conventional temperature sensor.
Figure 2:
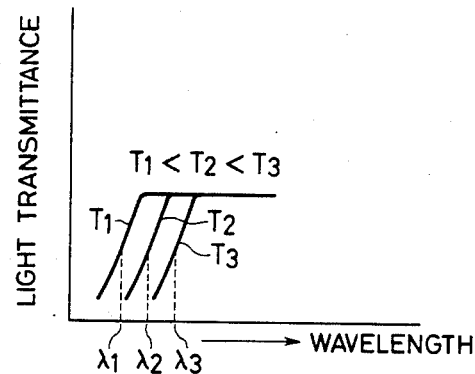
FIG. 2 is a graph showing a relation of temperature dependency of transmittance of the temperature sensor.
Figure 3:
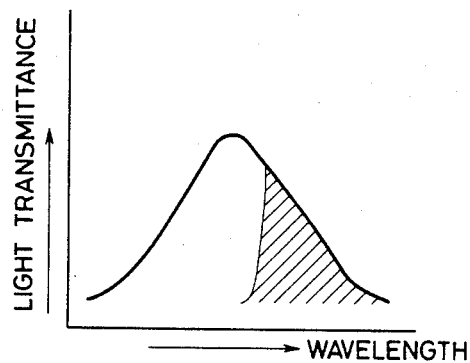
FIG. 3 is a graph showing a relation of a spectrum of light from a light-emitting element to a light transmittance of the temperature sensor.
Figure 4:
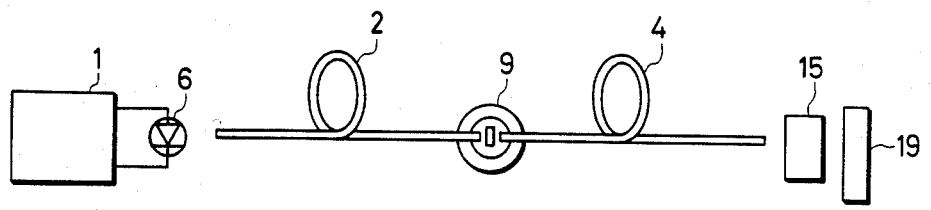
FIG. 4 shows schematically an embodiment of the present invention.
Figure 4:
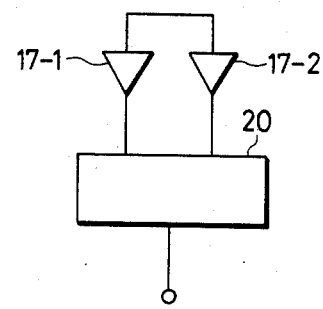

In FIG. 4, which schematically shows a preferred embodiment of a temperature measuring device of the present invention, reference numerals seen commonly in FIG. 1 designate the same or corresponding components.

A light-emitting element 6 is driven by a light-emitting element drive circuit 1, and light emitted from the element 6 is guided through an optical fiber 2 to a temperature sensor 9. The output of the latter is guided through an optical fiber 4 and a diffraction grating 15 to an array of CCDs (charge-coupled devices) 19. Outputs of the CCDs 19 are connected through respective comparators 17-1 and 17-2, operating with different comparison levels, to a processing circuit 20.

Figure 5A:
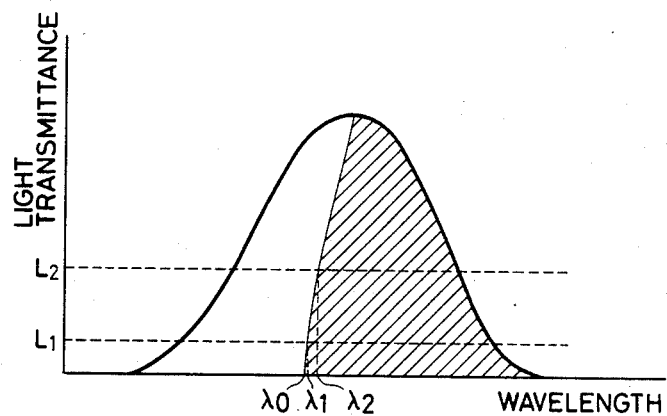
FIG. 5A and 5B are illustrations each showing a relation of the spectrum of light passing through the temperature sensor and the transmittance of the temperature sensor when the intensity of light emitted from the light-emitting element varies.
Figure 5B:
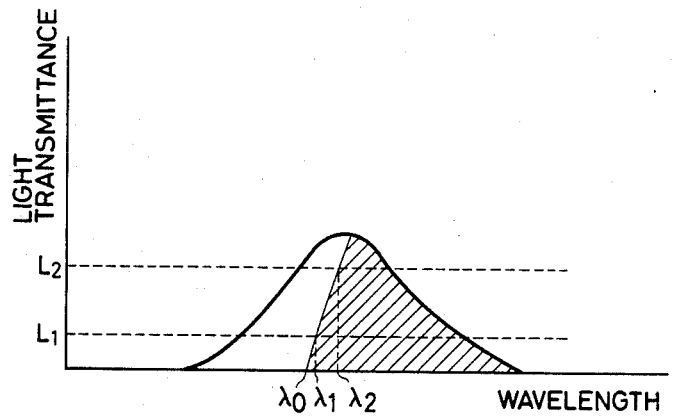

FIG. 5A shows the spectrum of light emitted from the light-emitting element 6 in which the hatched portion indicates light passing through the temperature sensor 9 at a certain temperature. FIG. 5B, similar to FIG. 5A, illustrates the case where the intensity of light emitted from the light-emitting element 6 is at a lower level.

In operation, a light component passed through the temperature sensor 9 is spectroscopically separated by the diffraction grating 15 into a plurality of components (in this case, two components), and these components are converted into a time series of electric signals by the CCDs 19, which signals are then compared by the comparators 17-1 and 17-2 with different comparison levels.

A rising point $\lambda$ of a curve drawn by plotting higher ends $\lambda_1$ and $\lambda_2$ of the absorption spectral range of the light passing through the temperature sensor 9 at different levels is constant regardless of variations of the light intensity due to temperature variations or time dependent degradation of the light-emitting element 6, as shown by the hatched portion in FIGS. 5A and 5B.

According to the present invention, wavelengths $\lambda_1$ and $\lambda_2$, which are the shortest wavelengths of the light passing ranges of the temperature sensor 9 at levels $L_1$ and $L_2$, respectively, are detected by the comparators 17-1 and 17-2, respectively. The wavelength values $\lambda_1$ and $\lambda_2$ are operated upon by the processing circuit 20 to obtain a shortest wavelength $\lambda_0$, which is a fixed value inherent to the temperature sensor 9, that is, it is fixed regardless of variations of the light intensity from the light-emitting element 6 and/or variations of the center wavelength of the light from the light-emitting element 6, with the assumption that the curve is substantially linear.

The processing circuit 20 may be implemented with a microprocessor in which the above calculation is performed digitally.

In this embodiment, the converted electric signals are obtained after the spectroscopic treatment of the light passing through the temperature sensor, and therefore, the signal levels are relatively low and, in some cases, contain errors due to dark current. According to a second embodiment of the present invention shown in FIG. 6, the possibility of such error is removed by introducing a light intensity modulation system to the temperature sensing device.

Figure 6:
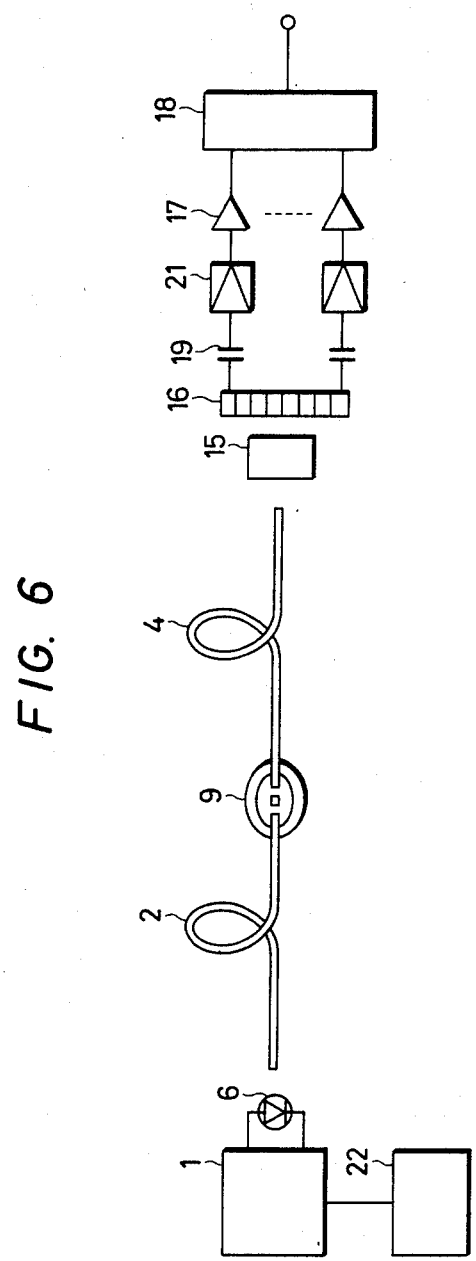
FIG. 6 shows schematically another embodiment of the present invention.

In FIG. 6, a conventional photodiode array 16 is used and a series connection of a capacitor 19 and an amplifier 21 is inserted between each of the photodiodes and each of comparators 17. Outputs of the comparators 17 are connected to a conventional processing circuit 18. A pulse generator 22 is connected to a light-emitting element drive circuit 1.

In operation, the drive circuit 1 is driven by the pulse generator 22 to energize the light-emitting element 6 intermittently in synchronism with the pulse output of the generator 22. In the operation of this device, during the active period of the light-emitting element 6, the operation is the same as that of the conventional device, that is, light from the element 6 passes through the optical fiber 2, the temperature sensor 9, and the optical fiber 4, and the resultant light has a spectrum as shown by the hatched portions in FIGS. 5A and 5B, which is spectroscopically separated by the diffraction grating 15. On the other hand, during the inactive periods of the light-emitting element 6, outputs of the respective photodiodes of the array 16 become dark currents.

However, with the provision of the a.c. coupling circuits each composed of a capacitor 19 and amplifier 21, the dark current components are removed and only the electric signals related to the light components are amplified, which are compared with the different reference levels by the comparators 17. Thus, light components higher than the reference levels are operated upon by the processing circuit 18 to obtain the lowest wavelength values of the spectroscopically separated light components.

Although the photodiode array 16 is used in this embodiment, it is of course possible to replace it with a CCD array 19.

I claim:

1. A temperature measuring device comprising: a light source; a spectroscope; means for defining an optical path comprising optical fiber means; a temperature sensor of a material having temperature dependant light absorption characteristics, said temperature sensor having one end coupled through a first portion of said optical path to said light source and the other end coupled through a second portion of said optical path to said spectroscope; first means for converting an optical output of said spectroscope into an electrical signal; second means for detecting said electrical signal with a plurality of different reference levels corresponding to different amounts of light passed through said temperature sensor to obtain wavelength values in absorption wavelength ranges of said temperature sensor, each of said wavelength values corresponding to a respective one of said reference levels; and third means for processing said wavelength values to obtain on a temperature dependent light absorption characteristic curve of said temperature sensor a shortest wavelength of light that said sensor passes.

2. The temperature measuring device as claimed in claim 1, wherein said second means has two reference levels and said third means comprises means for determining said shortest wavelength from said wavelength values in the absorption wavelength ranges of said temperature sensor according to a linear approximation of said temperature dependent light absorption characteristic curve.

3. The temperature measuring device as claimed in claim 1, further comprising fourth means for intensity modulating said light source, and fifth means for a.c. coupling said output of spectroscope to said second means.

4. The temperature mesuring device as claimed in claim 3, wherein said fourth means comprises means for driving said light source pulsedly at a predetermined frequency.

* * * * *